United States Patent [19]

Lu

[11] Patent Number: 5,818,675
[45] Date of Patent: Oct. 6, 1998

[54] PROTECTION DEVICE FOR ELECTRONIC CIRCUITS

[76] Inventor: Chao-Cheng Lu, 4-4, Alley 27, Lane 143 Chun Kung Rd., Taipei 11614, Taiwan

[21] Appl. No.: 744,000

[22] Filed: Nov. 4, 1996

[51] Int. Cl.$^6$ .................................................. H02H 3/00
[52] U.S. Cl. .............................. 361/93; 361/79; 361/115
[58] Field of Search ................................. 361/90, 91, 92, 361/93, 115, 58, 79

[56] References Cited

U.S. PATENT DOCUMENTS

| 4,180,745 | 12/1979 | Bartlett | 307/45 |
| 4,769,587 | 9/1988 | Pettigrew | 323/209 |

Primary Examiner—Jeffrey A. Gaffin
Assistant Examiner—Stephen Jackson
Attorney, Agent, or Firm—Jacobson, Price, Holman & Stern, PLLC

[57] ABSTRACT

The protection device of an electronic circuit is an electronic AC circuit protection device. The protection device has the characteristic of over-voltage protection, over-current protection, electronic switch, and soft start. Devices of the protection circuit are electronic box, electronic devices box, and power factor regulator that is designed in the structure of L.C. in parallel on the source side of the protection circuit. The protection circuit can be applied in switching power supply, electronic ballast, etc., electronic circuit devices. The main electrical electronic devices include Triac Thyristor, Silicon Controlled Rectifier, Phototriac Coupler and Photothyistor Coupler etc. The protection device has characteristic of standing surge current that solving the problem of life and reliability of electronic devices in now a day. The invention is a necessary protection device for electrical industrial.

3 Claims, 5 Drawing Sheets

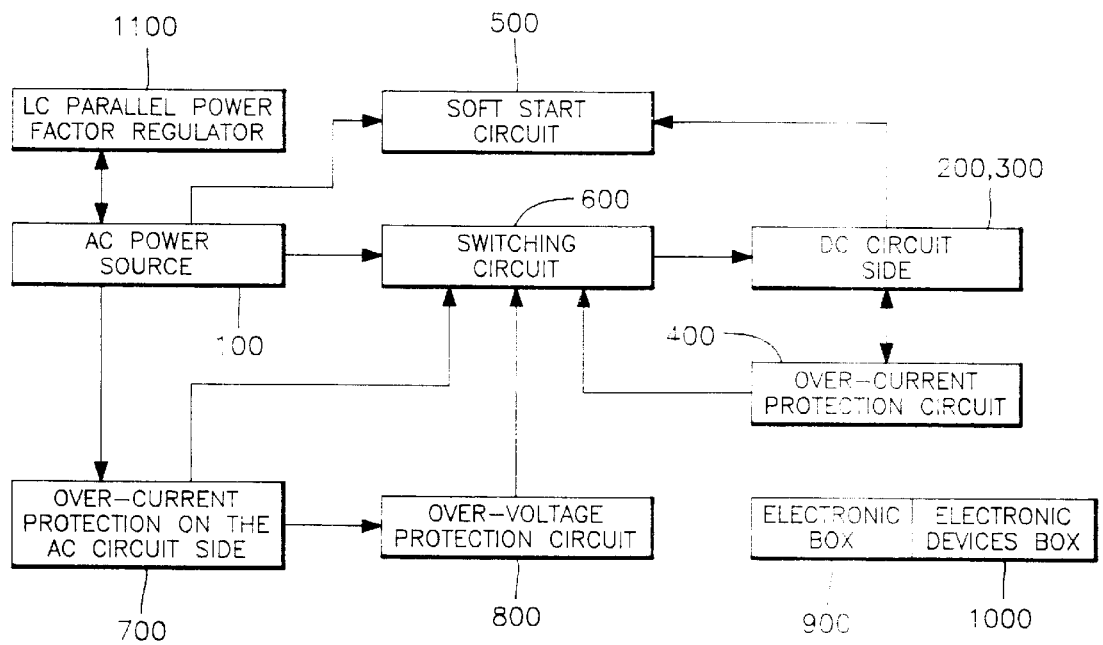
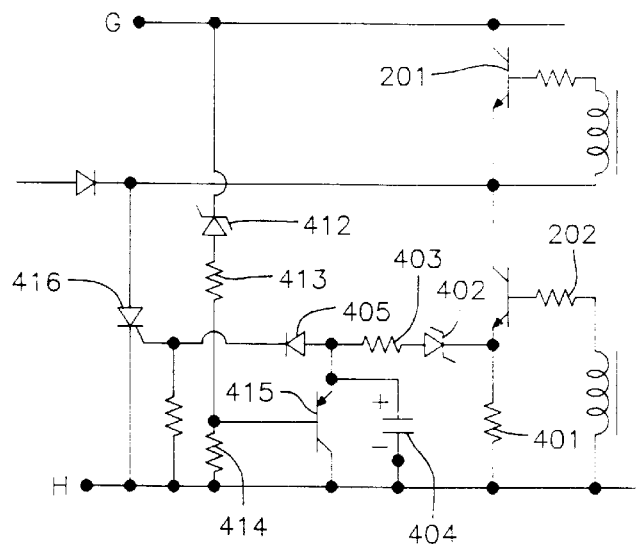

5,818,675

PROTECTION DEVICE FOR ELECTRONIC CIRCUITS

BACKGROUND OF THE INVENTION

There are many disadvantages in conventional switching power supply and electronic ballast circuits. The protection circuit is always set on the DC circuit side of the whole circuit and the circuits usually designed using semiconductors and Transistors as main devices. For instance, when the source voltage is disconnected from 110 VAC to 380 VAC, the DC filter Capacitor will be damaged by the abnormal source voltage. Other electronic devices will be damaged as well. On the other hand, when the source voltage is greater than the original setting, the AC source side and the DC circuit side will be an open circuit if the protection circuit is set on the AC circuit side of the whole circuit. That is, the devices on the DC circuit side will not be damaged. The DC circuit side will be non voltage to remain safety when the over-load situation appears on the DC circuit side. The L.C. parallel power factor regulator gives industrial more choices when they pick the power factor regulator.

SUMMARY OF THE INVENTION

1. Over-current protection circuit on the DC circuit side: On the DC side, the circuit according to the present invention is composed of a sampling Resistor, Zener Diode, time coefficient circuit that is composed of a time coefficient Resistor and Capacitor, zero adjustment circuit, Diode, Transistor, and Photothyristor Coupler. When the load current is greater than the original setting on the DC circuit side, a drop-voltage will be taken from the sampling Resistor. It will make the Photothyristor Coupler work to make the source voltage switch off on the AC circuit side. The whole circuit will remain safety.

2. Over-current protection circuit on the AC circuit side: On the AC side, the circuit is composed of a current transformer, full-wave-rectified device, Zener Diode, time coefficient circuit that is composed of a coefficient Resistor and Capacitor, ratio Resistor, Transistor, and Photothyristor Coupler. The Photothyristor Coupler will work to make the source voltage switch device off when the over-load appears on the AC or DC circuit side of the circuit. The whole circuit will remain safety.

3. Over-voltage protection circuit on the AC circuit side: The circuit is further composed of a Full-wave-rectified device, ratio Resistor, Zener Diode, Transistor, and Phototriac Coupler. The Phototriac Coupler will work to make the source voltage switch off when the voltage on the AC circuit side is greater than the Zener Voltage. The whole circuit will remain safety.

4. Switching circuit on the AC circuit side: The circuit is further composed of a Phototriac coupler and triac Thyristor Coupler. The Phototriac is controlled by the over-voltage protection circuit. The signal of on-and-off in the over-current protection on the DC and AC circuit side is transferred by Photo devices. It is one of the characteristics in this patent.

5. Soft Start circuit on the AC circuit side: The circuit is also composed of the zero adjustment circuit on the DC circuit side, time coefficient circuit that composed of coefficient Resistor and Capacitor, Zener Diode, Transistor, drop-voltage Resistor, Phototriac Coupler, and triac Thyristor. The AC current flow through the drop-voltage Resistor when the source voltage is applied. The Inrush Current is limited at this time. The load will have the normal safety current as designed. Then the triac Thyristor works to make the drop-voltage Resistor short circuited after the setting time. The voltage on the AC circuit side will come back to normal supplied voltage.

6. Electronic Box: An electronic box is provided as a discrete component that composed of the devices or parts that are easily damaged or short reliability. It is easy for users to repair or replaces.

7. Electronic Devices Box:

Except the electronic parts, the electronic devices box can be composed of electronic boxes. It can also be composed of some part of the electronic box in the electronic devices box or some part of the electronic box out of the electronic devices box.

8. L.C. Parallel Power factor regulator:

The power factor regulator is composed of L.C. in serial generally. According to the experiment, same L value can have smaller C value in parallel and larger C value in serial in the application of electronic ballast.

BRIEF DESCRIPTION OF THE DRAWING

FIG. 1: The block diagram of the invention.

FIG. 3: The over current protection on the DC circuit side of the invention.

DETAILED DESCRIPTION OF THE PREFERRED EMBODIMENTS

Figure 2:
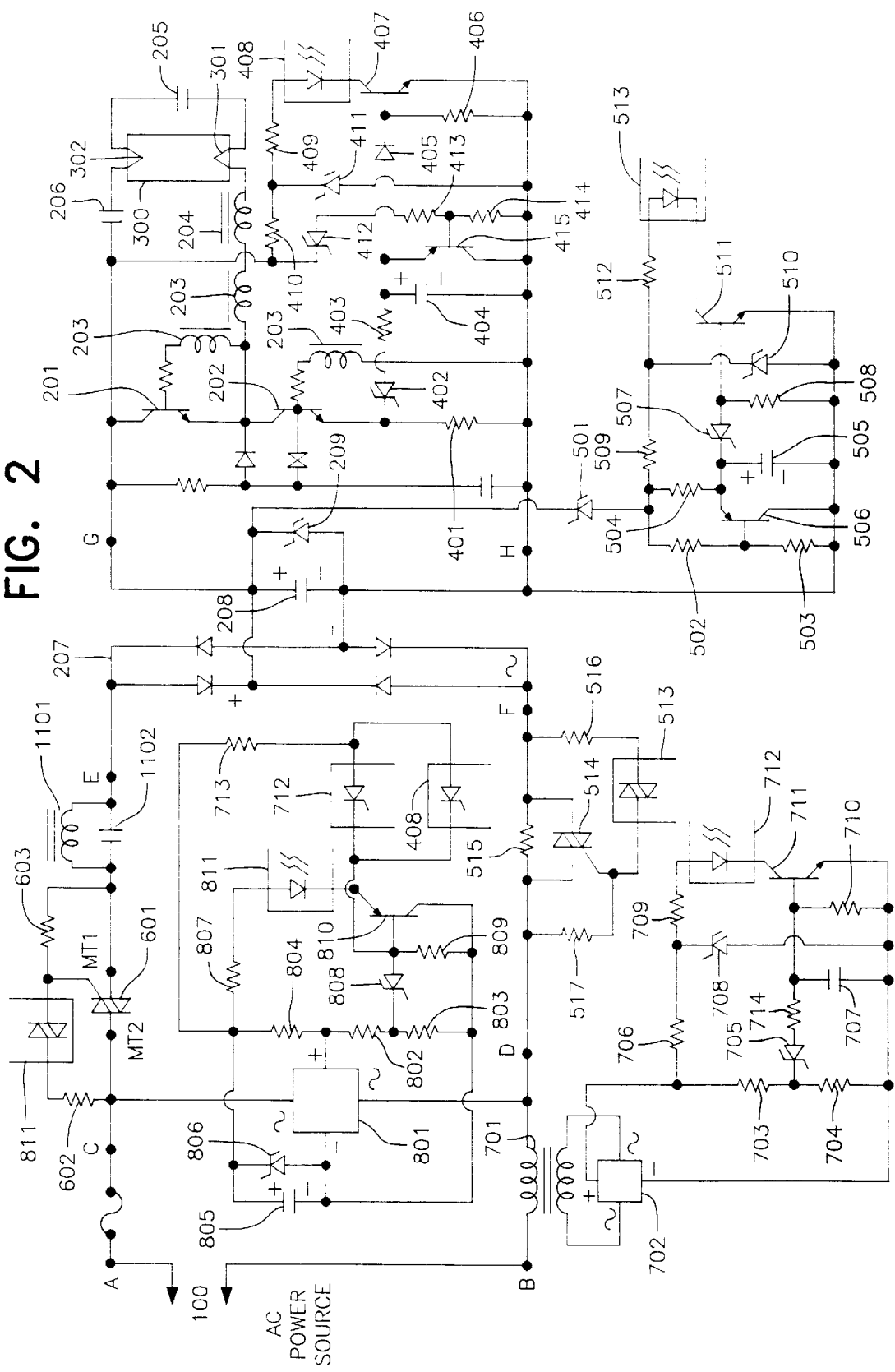
FIG. 2: The circuit diagram of the invention that related to electronic ballast and samples.

FIG. 1 is a block diagram of the invention. It is composed of AC source 100, DC source 200, 300, half-bridge oscillator by serial harmonic oscillating theory 200, fluorescent bulb 300, over current protection circuit 400, soft start circuit 500, switching circuit 600, over current protection circuit on the AC circuit side 700, over voltage protection circuit 800, electronic box 900, electronic devices box 1000, and L.C. parallel power factor regulator 1100.

In FIG. 2, the half-bridge oscillator circuit 200 and fluorescent bulb 300 do not belong to this invention. A great voltage drop takes place between the sampling Resistor 401 when the current that flow through the Transistor 202 is great. A current charges to time coefficient Resistor 403 and Capacitor 404 when the voltage drop is greater than the Zener Voltage of Zener 402. The current of the time coefficient Capacitor 404 flows through the diode 405 to the base of the Transistor 407. The state between the Collector and Emitter is on. The LED of the Photothyristor Coupler 408 is on and the SCR part of it is on. In the over voltage protection circuit 800, there is a positive voltage at the base of Transistor 810. The state between the Collector and Emitter of Transistor 810 is off. The LED of the Phototriac Coupler is off and the triac part is off state, too. The switching circuit 600 and triac 601 is in the off state at this moment. The protection function works because AC source 100 and DC circuit side 200, 300 are off. The voltage between the Collector and Emitter of the Transistor 407 can be measured from the Emitter Resistor 406. The state of the LED of the Photothyristor Coupler 408 can be measure by drop-voltage Resistor 410, Zener 411, and limiting current Resistor 409. The theory is the DC voltage after taken from the drop-voltage Resistor 410 at G tip makes a Zener Voltage at the N tip of Zener 411. After passing through the limiting current Resistor 409, the N tip voltage of the Zener 411 comes to the P tip of the Photothyristor Coupler LED. When the voltage of the G tip is smaller than the Zener Voltage of the Zener 412, the voltage between ratio Resistors 413 414 is zero. The Base voltage of Transistor 415 is zero, the Collector and Emitter are in the ON state at this time. The time coefficient Capacitor 404 discharges. The function is called Zero adjustment circuit. The Zero adjustment circuit does the zero adjusting job whenever the AC source 100 does the on-off job. As shown in FIG. 2, the N point of the Zener 501 is connected to the high DC voltage G point in the soft start circuit 500. The P point of the Zener 501 is connected to time coefficient Resistor 504, voltage-dropping Resistor 509, and the ratio Resistor 502 of the zero adjustment circuit. When the voltage of the G point is greater than the Zener Voltage of the Zener 501, the current charges to the time coefficient Capacitor 505 through time coefficient Resistor. When the voltage of the time coefficient Capacitor 505 is greater than the Zener Voltage of Zener 507, the Collector and Emitter of the Transistor 511 is on because the base of Transistor is positive voltage. At the same time, the LED of the Phototriac Coupler 513 is on, the Triac Thyristor 514 is on because the gate voltage of the Triac Thyristor 514 is positive. Then the load Resistor 515 is short-circuited by the MT1 and MT2 of the Triac Thyristor 514. The voltage between gate and MT1 of Triac Thyristor 514 can be measured by the gate Resistor 517. The limiting current Resistor 516 is designed to prevent the over-current of the Triac tip of the Phototriac Coupler 513. Because the serial connection of the dropping Resistor and Zener 510, a stable voltage can be measured at the N tip of the Zener 510. The stable voltage supplies the limiting current Resistor 512 and Phototriac Thyristor 513. The zero adjusting circuit is composed of ratio Resistors 502, 503, and Transistor 506. The zero adjusting circuit discharge the time coefficient Capacitor 505 everytime the AC source 100 on and off once. When the AC source 100 is on, the AC voltage is dropped by the load Resistor 515. The Inrush Current and the start current are limited and the soft start function is done in this soft start circuit. The on timing of the Triac Thyristor 505 is set by time coefficient Resistor 504 and time coefficient Capacitor 505, therefore; the load Resistor is short-circuited and the voltage of main circuit is supplied normally.

As shown in FIG. 2, The switching circuit 600 is composed of Triac Thyristor 601, limiting current Resistor 602, and the gate Resistor 603. When the Triac part of the Phototriac Coupler 811 in the over-voltage protection circuit 800 turns on, the Triac Thyristor 601 turns on, too. At this time, the AC circuit is on. If the Triac part of the photo Coupler 811 turns off, the Triac Thyristor 601 is off. At this time, the AC circuit is off. The limiting current Resistor 602 is designed to protect the Triac Thyristor part of the Phototriac Coupler 811. The voltage between the gate and MT1 of the Triac Thyristor 601 can be measure by the gate Resistor 603.

As shown in FIG. 2, the secondary of the current transformer generates a high voltage in the over-current protection circuit if the current of the AC circuit is greater than origin setting by accident. The high voltage is connected to the AC tip of the full-wave rectification circuit 702, the DC tip generates a DC high voltage. The DC voltage is separated by the ratio Resistors 703 and 704 the center point of 703 and 704 is connected to the N tip of the Zener 705. If the center point voltage of ratio Resistors 703, 704 is greater than the Zener Voltage of the Zener 705, a current charges to the time coefficient Resistor 714 and the time coefficient Capacitor 707. The base voltage of Transistor 711 is about DC 0.7 V, the Collector and Emitter of Transistor 711 is on. Therefore; the LED of Phototriac Coupler 712 is on. That causes the SCR on the other side turns on, and Transistor turns off. The Triac Thyristor 601 of switching circuit 600 turns off, the AC circuit is protected. The dropping-voltage Resistor 706, Zener 708, and limiting current Resistor 709 have the same function as the dropping-voltage Resistor 509, Zener 510, and limiting-current Resistor 512 of the soft start circuit 500 stated earlier.

As shown in FIG. 2, the AC circuit C, D are connected to the AC part of full-wave rectification in the over-voltage protection circuit 800. The positive tip is connected to dropping-voltage Resistor 804 and a tip of ratio Resistor 802 and 803. The negative tip is the ground of the protection circuit. The center point of ratio Resistors 802 and 803 is connected to the N tip of Zener 808. The Transistor gets a positive voltage at the base when the center point voltage of ratio Resistors 802 and 803 is greater than the Zener Voltage of Zener 808. The Collector and Emitter of Transistor 810 is off, the LED of Phototriac Coupler 811 is off, too. The Triac Thyristor 601 of the switching circuit 600 turns off. If the center voltage of the ratio Resistors 802 and 803 is smaller than the Zener Voltage of the Zener 808, the base of the Transistor 810 is grounded and the Collector-Emitter is on. The Triac Thyristor of the switching circuit 600 turns on. If the AC voltage of the AC source 100 is greater than the origin setting, this AC circuit is in off state. This is the theory of the protect circuit. The base of the Transistor 810 is connected to the SCR's Cathode of the Photothyristor Coupler 408 of the over-current protection circuit 400 on the DC circuit side, and the SCR's Cathode of the Photothyristor Coupler 712 of the over-current protection circuit 700 on AC circuit side. The voltage between the base and the Collector of the Transistor 809 can be measure by the base Resistor 809. The output of dropping-voltage Resistor 804 is connected to the N tip of Zener 806 and the positive of filter Capacitor 805 and the tip of the limiting-current 807. Because of the Zener 806 and the filter Capacitor 805, a DC voltage is on the limiting-current Resistor 807. The DC voltage also supplies the DC power of the limiting-current Resistor 812.

As shown in FIG. 2, the example of this invention set the AC source as A and B. A and C are the fuse tips. B and D are tip of the transformer 701 of the over-current protection circuit on AC circuit side. C and E are the MT1 and MT2 of the Triac Thyristor in the switching circuit 600. D and F are the tips of load Resistor 515 of the soft start circuit 500. E and F are the end of the AC circuit side and are connected to the AC tips of the bridge rectifier circuit 207. G and H are the positive and negative of the bridge rectifier circuit 207, and are connected to filter Capacitor 208 and Zener 209. The letters of the junctions are set to be convenient for analysis, the position of all protection circuits can be designed by required, it is not limited.

As shown in FIG. 3, the Transistor 407 is replaced by SCR 416 in the over-current protection circuit 400 on AC circuit side. The gate is connected to the N tip of Diode 405. The Anode is connected to the connection of the Transistor 201's Emitter and Transistor 202's Collector, the Cathode is connected to the H. When a large current occurs on the half-bridge oscillator 200 by accident, the sampling Resistor 401 gets a large voltage. That makes SCR 416 turn off. At this time, the oscillation is stop in the half-bridge oscillator 200, the fluorescent lamp turns off and is protected.

Figure 4:
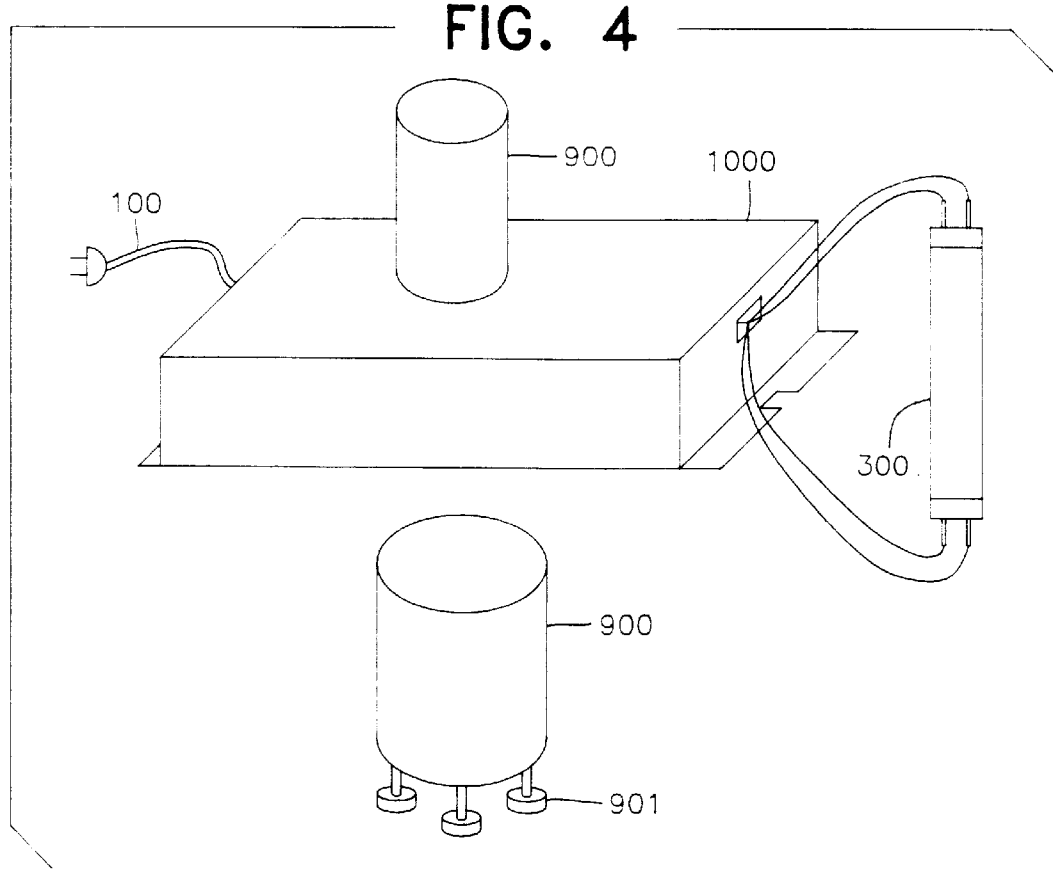
FIG. 4: The idea of the electronic box and discrete type of the invention.

As shown in FIG. 2, for convenience of service, the protection circuit and the circuits that be protected can be reorganized and ranged by the damage ratio. That can save lots of the services and test time. For example, G, H, I can be put in the electronic box 900 independently. As shown in FIG. 4, electronic box is composed of half-bridge oscillator 200 and over-current protection circuit 400. When one or both of them are out of order, they can be changed by prepared electronic box 900. The connection method between electronic box 900 and the other circuits is not limited. The electronic box 900 can be placed inside or outside of the electronic devices box 1000, or part of electronic box 900 placed in electronic devices box 1000, part of electronic box 900 out of electronic devices box 1000. The method can be designed by required and it is not limited. The connection number and type of the connection pin 901 and the outlook of the electronic box 900 also can be designed by required and not limited.

Figure 5:
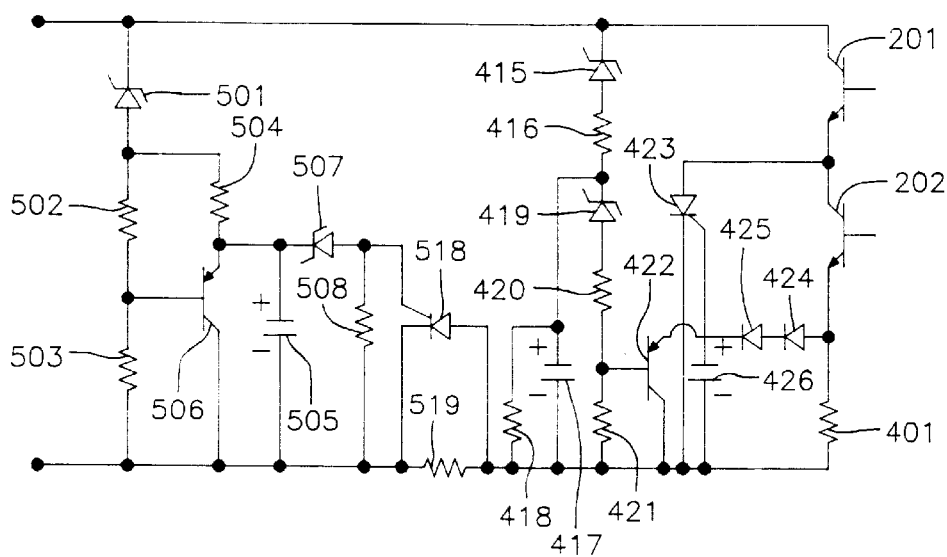
FIG. 5: The soft start circuit and over current protection sample circuit on the DC circuit side of the invention.

As shown in FIG. 5, the soft start circuit 500 can be place on the DC circuit side 200, or G junction and H junction. The working theory of Zener 501, time coefficient Resistor 504, zero adjustment ratio Resistors 502 503, Transistor 506, time coefficient Capacitor 505, Zener 507, base Resistor 518 is the same as the working theory in FIG. 2. But Transistor 511 is replaced by SCR 518. The gate of the SCR 518 is replaced by the base of Transistor 511. The Cathode of the SCR 518 is replaced by the Emitter of the Transistor 511. The Anode of the SCR 518 is replaced by the Collector of the Transistor 511. A load Resistor 519 is connected between the Anode and the Cathode of the SCR 518. The function of the load Resistor 519 is the same as the function of the load Resistor 515 on the AC circuit side. The soft start circuit 500 on the DC circuit side 200 and the soft start circuit 500 on the AC circuit side 100 can be either one or both existed.

Shown in FIG. 5, is the other over-current protection circuit 400 on the DC circuit side in this invention. When the voltage of the G is greater than the Zener Voltage of the Zener 415, the current on G charges to the time coefficient Capacitor 417 through time coefficient Resistor 416. When the charged voltage is greater than the Zener Voltage of Zener 419, the current flows through the ratio Resistors 420 421 of the zero adjustment circuit. The center point of the ratio resistors 420 421 is connected to the base of the Transistor 422. At this time, the state of the Transistor 422's Collector and the Emitter is off. When the voltage of the sampling Resistor 401 is greater than the Turn-on voltage of the Diode 624 625, the current flow through them charges to Capacitor 426. When the charge voltage is higher enough for gate action, the SCR 423 turns on. The Anode of the SCR 423 is connected to the Emitter of Transistor 201 and the Collector of Transistor 202. The main purpose is to stop the circuit which is protected when the SCR 423 turns on. Therefore; position of the Anode of SCR 423 is not limited in any place of the protection circuit.

Figure 6:
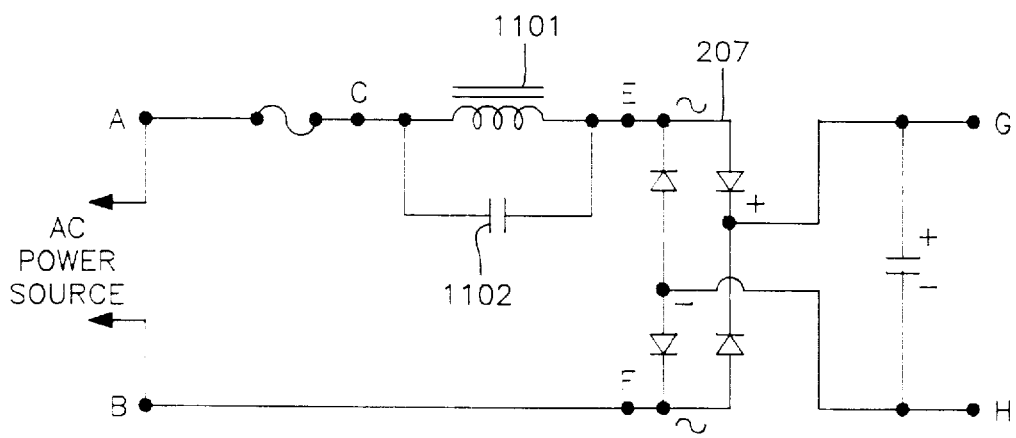
FIG. 6: The circuit of the L.C. parallel power factor regulator of the invention.

As shown in FIG. 6, L.C. parallel type power factor regulating device is placed on the AC source side. It is connected to the AC circuit in serial, the output of it are connected to the AC junctions of the fill wave bridge rectifier 207 or E F. The G H or DC junctions of the full wave bridge rectifier 207 supplies the DC source for load. Generally the load characteristic of the switching power supply and electronic ballast for fluorescent lamp is capacity. When the resonance occurs between the capacity load, the inductance of the L 1101, and the frequency of the AC source, the power factor of the AC input is 1. At this time, C1102 and L1101 must avoid the parallel resonance with the frequency of the AC source. If the load characteristic is inductive, the resonance occurs between the capacity C1102, the inductive load, and the frequency of the AC source, the power factor of the AC input is 1. The L.C. parallel type power factor regulating device is different from ordinary passive device L.C. serial type power factor regulating device.

Figure 7:
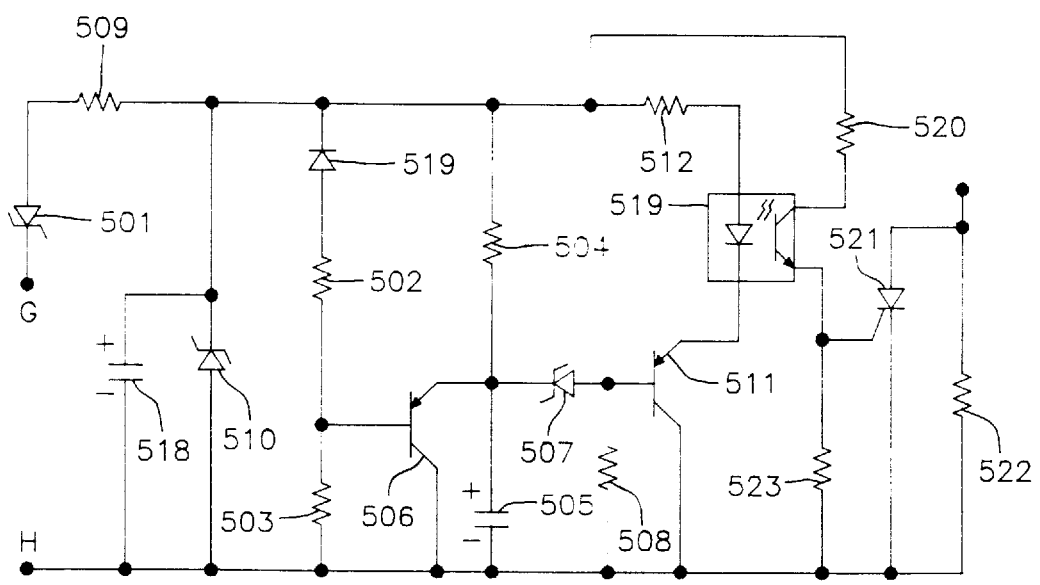
FIG. 7: The sample circuit of the soft start circuit on the DC circuit side of the invention.

FIG. 7 shows the circuit that the soft start circuit 500 work in DC instead of AC in FIG. 2. As shown in the diagram, the working theory is the same as in FIG. 2 from Zener 501 . . . to limiting-current Resistor The difference is a Zener 519 is added to the circuit and connected to ratio Resistors in serial. The dropping-voltage Resistor 509 is moved to the P tip of the Zener 501. The Zener 510 is moved to the tip of the dropping-voltage Resistor 509. For the stable of the soft start circuit 500, a Capacitor 518 is connected to the Zener 510 in parallel, the Phototriac Thyristor 513 is replaced by photocoupler 519. A limiting-current Resistor 520 is connected to the input junction of the output side of the photocoupler 519. The output is connected to the gate of the SCR 521. A load Resistor 522 is connected between the Cathode and the Anode of the SCR 521. The Cathode of the SCR 521 is connected to the H. The Anode of the SCR 521 is connected to the common ground of the DC circuit side 200. The working theory is mostly like the working theory of the soft start circuit 500 in FIG. 2. When the voltage is applies to the AC source, the state between Cathode and Anode of the SCR 521 is off. The DC voltage of the DC circuit side 200 is effected by the load Resistor 522, the supply voltage is dropped and the current reduced. The output of the Photo Coupler 520 turns on after the timing that was set by the time coefficient circuit. At this time, the state between Anode and Cathode of SCR 521 is on. The load Resistor is short circuited by the SCR 521. At this time, the DC circuit side 200 supplies the power normally. The gate voltage of the SCR 521 can be measured by the gate Resistor 523.

Figure 8:
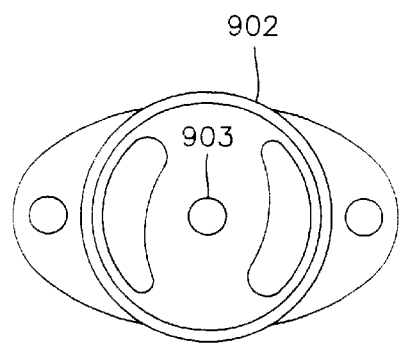
FIG. 8: The diagram of the socket of the invention.

FIG. 8 shows the example of the stand 902 that is match to the electronic box 900 in FIG. 4. As stated before, electronic box 900 and electronic devices box can be connected in non-limited ways. The example shows the three junctions electronic box 900. The stand 902 can be used as well as the start-stand of the fluorescent lamp. The difference is the center junction 903 can be added to the starter-stand for signal and power transmission.

Figure 9:
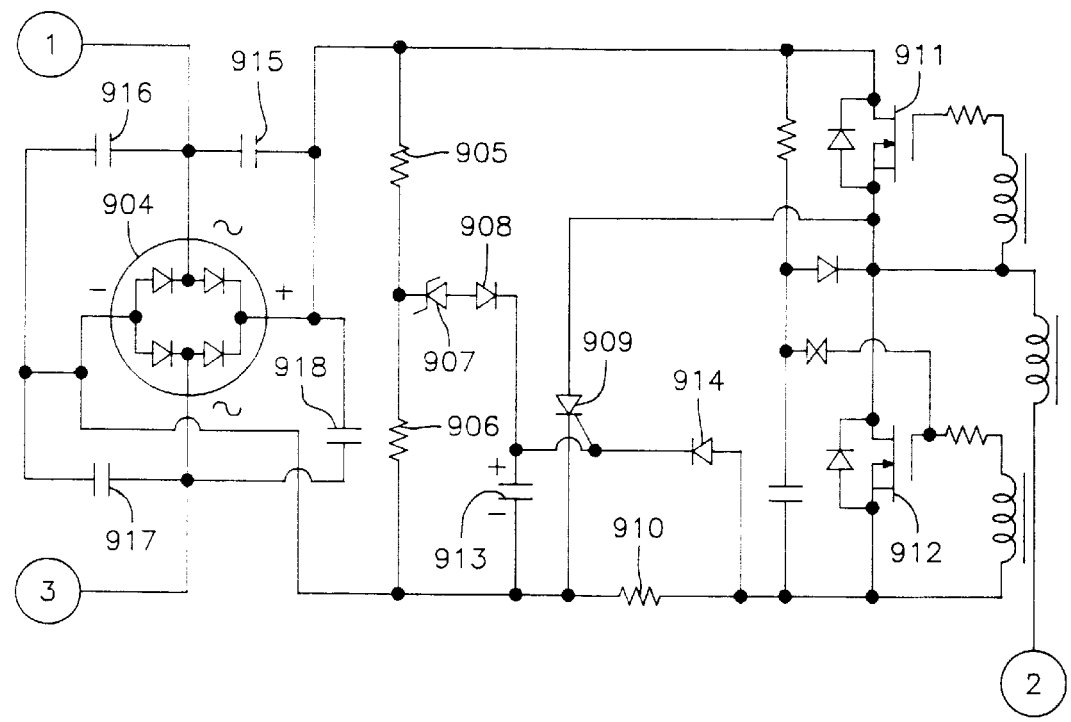
FIG. 9: The sample circuit of the electronic box of the invention.

FIG. 9 shows the circuit example of the 3 junctions electronic box 900. The 1 junction and the 3 junction are connected to the positive and negative power source or G, and H in FIG. 2. The 1 junction is connected to the AC junction of full wave bridge rectifier 904. The positive voltage of the full wave bridge rectifier supplies the ratio Resistors 905 906 of the over-voltage protection. The center point of the ratio Resistors 905 906 is connected to the N tip of Zener 907. The P tip is connected to the P tip of diode 908. The N tip of the Diode 908 is connected to the gate of SCR 909. When the voltage of junction 1 3 is greater than origin setting, Zener 907 turns on. The voltage goes to the gate of SCR 909 through Diode 908, the SCR 908 turns on. The function of the half bridge oscillator stops. The protection function is completed. When the current flows through the half bridge oscillator is greater than the origin setting, the voltage across the sampling Resistor 910 is greater than the Turn-on voltage of the SCR 909. The SCR turns on, the half bridge oscillator circuit stops. The over-current function is completed. Except the position in FIG. 9, the Anode of the SCR 909 also can be connected to the gate of the power MOSFET 912. There are Capacitor 913 and Diode 914 connected to the gate of the SCR 909. The function of the Capacitor 913 is to get a average voltage at the gate when a surge voltage is applied. That can avoid the wrong action of the SCR 909. Because of the bridge rectifier circuit, the voltage across the 1 and 3 are non polarity, this is a very important characteristic of the example. The 2 is the output of the half bridge oscillating circuit. It can be the center point of the stand 902 in FIG. 8.

As shown in FIG. 9, the AC junctions, positive, negative voltage junctions are connected with four high frequency capacitor 915 916 917 918. The four capacitors compose the bridge Capacitor circuit. The function of the bridge Capacitor is to let the high frequency current pass. The work voltage and the capacity of the high frequency Capacitors 915 916 917 918 is depend on the require of the oscillator and not limited.

I claim:

1. An AC protection circuit device comprising:
    an AC side having an AC circuit comprising;
        an AC power source;
        an over-current protection circuit for cutting off the AC circuit when over-current occurs on a DC side;
        an over-voltage protection circuit for cutting off the AC circuit when voltage from the AC power source is abnormally high;
        LC parallel power factor regulator;
    the DC side having a DC circuit comprising an over-current protection circuit for cutting off the DC circuit when over-current occurs on the DC side;
    a soft-start circuit for automatically soft-starting the DC side and the AC side; and,
    a switching circuit for switching between the AC side and the DC side.

2. The circuit of claim 1, the over-current protection circuit of the DC side further comprising:
    a sampling resistor having a first tip and a second tip connected to a common ground;
    a first zener diode having an N-tip connected to the first tip of said sampling resistor and a P-tip;
    a time coefficient resistor have a first tip connected to the P-tip of said first zener diode and a second tip;
    a time coefficient capacitor having a positive tip connected to the second tip of said time coefficient resistor and a negative tip connected to the common ground;
    a zero voltage circuit comprising;
        a first transistor having an emitter connected to the second tip of said time coefficient resistor, a tip connected to the common ground and a base;
        a first ratio resistor having a first tip connected to the base of said first transistor and a second tip connected to the common ground;
        a second ratio resistor having a first tip connected to the base of said first transistor and a second tip;
    a diode having a P-tip connected to the second tip of said time coefficient resistor and an N-tip
    a second transistor having a base connected to the N-tip of said diode and an emitter connected to the common ground a second zener diode having a P-tip connected to the second tip of said second ratio resistor and an N-tip connected to a positive of the DC circuit of said DC side;
    a drop-voltage resistor having a first tip connected to the N-tip of said second zener diode and a second tip;
    a first limiting current resistor having a first tip connected to the second tip of said drop-voltage resistor and a second tip; and,
    a photothyristor coupler having a P-tip connected to the second tip of said first limiting current resistor, an N-tip connected to the base of said second transistor, and an SCR tip connected to the AC circuit such that an anode of the SCR is connected to a second limiting-current resistor in series, a cathode of the SCR is connected to a base of a PNP transistor of the AC circuit, wherein the photothyristor coupler transmits an ON-OFF signal to the SCR.

3. The circuit of claim 1, the soft circuit for starting the AC side further comprising:
    a zero voltage adjustment circuit comprising;
        a first zener diode having an N-tip connected to a positive of the DC circuit and a P-tip;
        a first ratio resistor having a first tip connected to the P-tip of said first zener diode and a second tip;
        a second ratio resistor having a first tip connected to the second tip of said first ratio resistor and a second tip connected to a common ground;
        a PNP transistor having a base connected to the second tip of said first ratio resistor, a collector connected to the common ground, and an emitter;
    a time coefficient resistor having a first tip connected to the emitter of said PNP transistor and a second tip connected to the P-tip of said first zener diode;
    a time coefficient capacitor having a positive tip connected to the emitter of said PNP transistor and the first tip of said time coefficient resistor and a negative tip;
    a second zener diode having an N-tip connected to the first tip of said time coefficient resistor and a P-tip;
    an NPN transistor having a base connected to the P-tip of said second zener diode, an emitter connected to the common ground, and a collector;
    a base resistor having a first tip connected to the P-tip of said NPN transistor and a second tip connected to the common ground.
    a dropping voltage resistor having a first tip connected to the P-tip of said first zener diode and a second tip;
    a third zener diode having an N-tip connected to the second tip of said dropping voltage resistor and a P-tip connected to the common ground;
    a limiting current resistor having a first tip connected to the second tip of said dropping voltage resistor and the N-tip of said third zener diode and a second tip; and,
    a phototriac coupler having an LED with a P-tip connected to the second tip of said limiting current resistor, and an N-tip connected to the collector of said NPN transistor, the phototriac coupler further connected to a gate of a triac thyristor of the AC circuit such that ON-OFF is controlled by a phototriac coupler of the DC circuit.

* * * * *